(12) United States Patent
Kitagawa et al.

(10) Patent No.: US 9,391,330 B2
(45) Date of Patent: *Jul. 12, 2016

(54) ELECTRODE MATERIAL, METHOD FOR PRODUCING THE SAME, ELECTRODE AND BATTERY

(71) Applicant: SUMITOMO OSAKA CEMENT CO., LTD., Chiyoda-ku, Tokyo (JP)

(72) Inventors: Takao Kitagawa, Tokyo (JP); Mitsumasa Saito, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 100 days.

This patent is subject to a terminal disclaimer.

(21) Appl. No.: 14/134,713

(22) Filed: Dec. 19, 2013

(65) Prior Publication Data

US 2014/0106224 A1    Apr. 17, 2014

Related U.S. Application Data

(63) Continuation of application No. 12/746,873, filed as application No. PCT/JP2008/072401 on Dec. 10, 2008, now Pat. No. 8,658,316.

(30) Foreign Application Priority Data

Dec. 10, 2007  (JP) .................................. 2007-318937

(51) Int. Cl.
| | |
|---|---|
| *H01M 4/583* | (2010.01) |
| *H01M 4/485* | (2010.01) |
| *H01M 4/36* | (2006.01) |
| *C01B 25/37* | (2006.01) |
| *H01M 4/13* | (2010.01) |
| *H01M 4/62* | (2006.01) |
| *H01M 4/505* | (2010.01) |

(Continued)

(52) U.S. Cl.
CPC ............... *H01M 4/583* (2013.01); *C01B 25/37* (2013.01); *H01M 4/13* (2013.01); *H01M 4/366* (2013.01); *H01M 4/485* (2013.01); *H01M 4/625* (2013.01); *H01M 4/505* (2013.01); *H01M 4/525* (2013.01); *H01M 4/5825* (2013.01); *Y02E 60/122* (2013.01); *Y02P 70/54* (2015.11)

(58) Field of Classification Search
None
See application file for complete search history.

(56) References Cited

U.S. PATENT DOCUMENTS

| | | | |
|---|---|---|---|
| 5,888,671 A | | 3/1999 | Yamasaki et al. |
| 6,878,487 B2 * | | 4/2005 | Cho et al. ..................... 429/212 |

(Continued)

FOREIGN PATENT DOCUMENTS

| | | |
|---|---|---|
| JP | 9-320596 | 12/1997 |
| JP | 10-21912 | 1/1998 |

(Continued)

OTHER PUBLICATIONS

Notice of Allowance for Japanese Patent Application No. JP 2007-318937 (mailed Jan. 7, 2014).

(Continued)

*Primary Examiner* — Patrick Ryan
*Assistant Examiner* — Christopher Domone
(74) *Attorney, Agent, or Firm* — Merchant & Gould P.C.

(57) ABSTRACT

An electrode material containing an electrode active material, and a carbonaceous coating film which covers the electrode active material and contains sulfur; and an electrode material including a secondary particle including a plurality of primary particles as the electrode active material, wherein the primary particles are covered with a carbonaceous coating film so that the carbonaceous coating film is interposed between the primary particles and the carbonaceous coating film contains sulfur.

10 Claims, 1 Drawing Sheet

(51) Int. Cl.
    *H01M 4/525*     (2010.01)
    *H01M 4/58*     (2010.01)

(56) References Cited

U.S. PATENT DOCUMENTS

| | | | |
|---|---|---|---|
| 2002/0086211 A1 | 7/2002 | Umeno et al. | |
| 2004/0175618 A1* | 9/2004 | Inoue | C01G 51/42 429/231.1 |
| 2004/0253510 A1* | 12/2004 | Jonghe et al. | 429/137 |
| 2007/0202405 A1 | 8/2007 | Shizuka et al. | |
| 2009/0104530 A1 | 4/2009 | Shizuka et al. | |

FOREIGN PATENT DOCUMENTS

| | | |
|---|---|---|
| JP | 10-223228 | 8/1998 |
| JP | 2001-015111 | 1/2001 |
| JP | 2002-63902 | 2/2002 |
| JP | 2002-216751 | 8/2002 |
| JP | 2004-014340 | 1/2004 |
| JP | 2004-014341 | 1/2004 |
| JP | A-2005-050556 | 2/2005 |
| JP | A-2006-093066 | 4/2006 |
| JP | 2006-261062 | 9/2006 |

OTHER PUBLICATIONS

Office Action for corresponding U.S. Appl. No. 12/746,873 (mailed Jan. 10, 2013).
Notice of Allowance for corresponding U.S. Appl. No. 12/746,873 (mailed Sep. 20, 2013).
International Search Report for International Patent Application No. PCT/JP2008/072401 (mailed Mar. 10, 2009).
Office Action from Japanese Patent Application No. JP 2007-318937 (mailed Jan. 29, 2013).

* cited by examiner

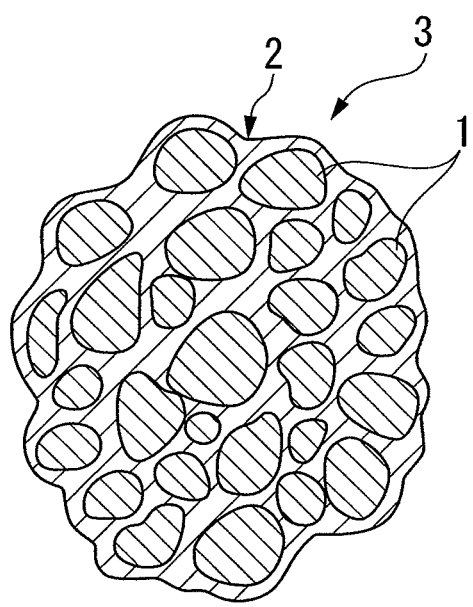

ELECTRODE MATERIAL, METHOD FOR PRODUCING THE SAME, ELECTRODE AND BATTERY

This application is a Division of U.S. Ser. No. 12/746,873, filed 8 Jun. 2010, which is a U.S. National Stage application under 35 U.S.C. §371 of International Patent Application No. PCT/JP2008/072401 filed 10 Dec. 2008, which claims the benefit of priority to Japanese Patent Application No. 2007-318937 filed 10 Dec. 2007, the disclosures of all of which are hereby incorporated by reference in their entireties.

TECHNICAL FIELD

The present invention relates to an electrode material, a method for producing the same, an electrode using the electrode material, and a battery.

BACKGROUND

Recently, as batteries which are increasingly expected to be smaller, lighter and have higher capacity, secondary batteries based on non-aqueous electrolysis solution systems such as lithium ion batteries have been proposed and provided in practical use.

In lithium ion batteries, lithium ions can be reversibly inserted and desorbed. That is, lithium ion batteries are formed of a positive electrode, a negative electrode, and a non-aqueous electrolyte, with a property that lithium ions can be inserted and desorbed.

As the material of the negative electrode of the lithium ion battery, a carbon-based material or a metal oxide containing Li having the property that lithium ions can be reversibly inserted and desorbed, such as lithium titanate ($Li_4Ti_5O_{12}$), are generally used as a negative electrode active material.

As the material of the positive electrode of the lithium ion battery, a metal oxide containing Li having a property that lithium ions can be reversibly inserted and desorbed, such as lithium iron phosphate ($LiFePO_4$) as a positive electrode active material, is used. An electrode material mixture including the positive electrode active material, a binder, an organic solvent and the like is applied onto a surface of a metal film called a collector, thereby forming a positive electrode of the lithium ion battery.

Lithium ion batteries as described above are light and small and have high energy as compared with secondary batteries such as lead batteries, nickel-cadmium batteries, and nickel-hydrogen batteries in the related art. Accordingly, lithium ion batteries are used as the power supply of mobile electronic apparatuses such as mobile phones and laptop computers. Recently, lithium ion batteries have been examined as a high power supply for electric cars, hybrid cars, electric tools, and the like, and batteries used for them are required to have high-speed charging and discharging properties. However, the electrode material including the electrode active material, for example, including a Li-containing metal oxide having the property that lithium ions can be reversibly inserted and desorbed, has a problem that electron conductivity is low.

Thus, an electrode material with improved electron conductivity has been proposed. For example, an electrode material is disclosed where a secondary particle includes a plurality of primary particles of an electrode active material represented by the formula $Li_xA_yB_zPO_4$ (in the formula, A is at least one kind selected from Cr, Mn, Fe, Co, Ni, and Cu, and B is at least one kind selected from Mg, Ca, Sr, Ba, Ti, Zn, B, Al, Ga, In, Si, Ge, Sc, Y, and rare-earth elements, where $0 \leq x < 2$, $0 < y < 1.5$, and $0 \leq z < 1.5$), and the surface of the electrode active material is covered with a carbonaceous coating film so that carbon as an electron conductive material is interposed between the primary particles. As a method for producing the electrode material, a method is disclosed where slurry including an electrode active material or a precursor of the electrode active material, and an organic compound is sprayed, it is dried to generate a granular material, and a heat treatment is performed on the granular material under a non-oxidizing atmosphere at 500° C. or higher and 1000° C. or lower (e.g., see Patent Documents 1 to 3).

However, the electrode material, that is, the electrode material where the secondary particle is an aggregate of the plurality of primary particles of the electrode active material represented by the formula $Li_xA_yB_zPO_4$, and carbon is interposed between the primary particles to cover the surface of the electrode active material with the carbonaceous coating film, is required to further improve the conductivity in order to achieve the high-speed charging and discharging properties and the like as described above. That is, the conductivity of the carbonaceous coating film is required to be further improved in order to achieve further sufficient electron conductivity.

In order to improve the conductivity of the carbonaceous coating film, for example, it is conceivable that an organic compound is carbonated at a high heat treatment temperature to raise the graphitization degree of the carbonaceous coating film. However, in this method, the specific surface area of the carbonaceous coating film is also increased by the increase of the heat treatment temperature. Generally, a paste-type electrode material mixture including an electrode material, binder resin (binder) for bringing particles of the electrode material into contact with each other, a solvent, and the like are used at the time of forming the positive electrode of a battery. However, when the specific surface area of the electrode material is increased, the amount of necessary binder resin and solvent is increased. As a result, there is a problem where the application performance of the electrode material mixture deteriorates.

Patent Document 1: Japanese Unexamined Patent Application Publication No. 2004-014340
Patent Document 2: Japanese Unexamined Patent Application Publication No. 2004-014341
Patent Document 3: Japanese Unexamined Patent Application Publication No. 2001-015111

DISCLOSURE OF INVENTION

Problems to be Solved by the Invention

The invention has been made in consideration of the above-described circumstances, and an object of the invention is to provide an electrode material having high conductivity and satisfactory application performance, a method for producing the same, an electrode formed using the electrode material, and a battery having a high discharge capacity at a high-speed charging and discharging rate and sufficient charging and discharging rate performance.

Means for Solving the Problems

The inventors have researched hard to solve the aforementioned problem. As a result, the inventors found that the graphitization degree of the generated carbonaceous coating film is improved and conductivity of the carbonaceous coating film is drastically improved even with a relatively low heat treatment temperature when an organic compound is subjected to a heat treatment in a state where sulfur content coexists. Since it is possible to employ the low heat treatment temperature, the inventors found that it is possible to obtain an electrode material mixture with excellent application performance, without increasing the specific surface area of the carbonaceous coating film or the specific surface area of the electrode material. The invention has been made as described above.

A first aspect of the invention is an electrode material including an electrode active material, and a carbonaceous coating film that covers the electrode active material and contains sulfur.

A second aspect of the invention is an electrode material including a secondary particle that includes a plurality of primary particles as an electrode active material, wherein the primary particles are covered with a carbonaceous coating film, and the carbonaceous coating film contains sulfur and is interposed between the primary particles.

It is preferable that the carbonaceous coating film further contains lithium.

A third aspect of the invention is a method for producing an electrode material including: preparing slurry including (a) an electrode active material or a precursor of the electrode active material, (b) an organic compound, and (c) sulfur or a sulfur compound; spraying and drying the slurry to generate a granular material; and performing a heat treatment on the granular material under a non-oxidizing atmosphere of 500° C. or higher and 1000° C. or lower to obtain the electrode material formed of an electrode active material and a carbonaceous coating film containing sulfur and covering the electrode active material.

It is preferable that the slurry further includes at least one of lithium and a lithium compound.

An electrode of the invention is formed using the electrode material including an electrode active material and a carbonaceous coating film covering the electrode active material and containing sulfur.

An electrode of the invention is formed using an electrode material, wherein the electrode material includes a secondary particle that includes a plurality of primary particles as an electrode active material, the primary particles that are covered with a carbonaceous coating film so that the carbonaceous coating film is interposed between the primary particles, and the carbonaceous coating film contains sulfur.

A battery of the invention has a positive electrode which is an electrode formed using an electrode material including an electrode active material and a carbonaceous coating film covering the electrode active material and containing sulfur.

A battery of the invention has a positive electrode which is an electrode formed using an electrode material, wherein the electrode material includes a secondary particle that includes a plurality of primary particles as an electrode active material, the primary particles are covered with a carbonaceous coating film so that the carbonaceous coating film is interposed between the primary particles and contains sulfur.

Effects of the Invention

The electrode material according to the first aspect of the invention has excellent conductivity since the electrode material is formed of the electrode active material and the carbonaceous coating film covering the electrode active material and containing sulfur. The electrode material has excellent conductivity, but the specific surface area thereof is not increased. For this reason, electrode forming paste including the electrode material, binder resin (binder), a solvent, and the like has excellent application properties.

The electrode material according to the second aspect of the invention includes a secondary particle that includes a plurality of primary particles as an electrode active material, wherein surfaces of the primary particles are covered with a carbonaceous coating film, and the carbonaceous coating film exists between the primary particles and contains sulfur. Since the carbonaceous coating film contains sulfur, conductivity of the electrode material is excellent. The electrode material has excellent conductivity, but the specific surface area thereof is not increased. Accordingly, the electrode forming paste including said electrode material, a binder resin (binder), a solvent, and the like has excellent application properties.

The method for producing the electrode material according to the third aspect of the invention is a method for producing an electrode material including an electrode active material and a carbonaceous coating film covering the electrode active material and containing sulfur. In this method, slurry including an electrode active material or a precursor of the electrode active material, an organic compound, and sulfur or a sulfur compound is sprayed, the sprayed slurry is dried to generate a granular material, and the granular material is subjected to a heat treatment under a non-oxidizing atmosphere of 500° C. or higher and 1000° C. or lower. According to this method, it is possible to efficiently and easily produce the electrode material having the aforementioned characteristics by a low-temperature heat treatment.

BRIEF DESCRIPTION OF THE DRAWINGS

FIG. 1 is a cross-sectional view illustrating an electrode material obtained by a method for producing an electrode material according to first and second embodiments of the invention.

BRIEF DESCRIPTION OF THE REFERENCE SYMBOLS

1: Primary particle
2: Carbon
3: Secondary particle

BEST MODE FOR CARRYING OUT THE INVENTION

Preferred examples of an electrode material, a method for producing the same, an electrode, and a battery of the invention will be described hereinafter. The electrode material of the invention is preferable particularly as a positive electrode material for a battery. Particularly, the electrode material is suitably used as a positive electrode material for a lithium ion battery.

Detailed description is provided to more easily understand the concept of the invention, but the invention is not limited thereto as long as there is no particular indication. Any modification, omission, addition or the like is possible without departing from the scope of the invention, insofar as problems are not caused.

"Electrode Material According to First Aspect"

An electrode material according to a first aspect of the invention includes an electrode active material and a carbonaceous coating film covering the electrode active material and containing sulfur (S).

In the invention, the carbonaceous material of the carbonaceous coating film means carbon, and the carbonaceous material is formed of carbon elements and the inevitable impurities, as long as there is no particular description. The carbonaceous coating film of the invention may include as necessary other components which provide no negative influence on battery characteristics. It is preferable that the carbonaceous coating film of the invention further contains lithium (Li). When the carbonaceous coating film contains sulfur and lithium, conductivity of the electrode material is further improved.

"Electrode Material of Second Aspect"

FIG. 1 is a cross-sectional view illustrating an embodiment of an electrode material according to a second aspect of the invention.

The electrode material includes a plurality of primary particles 1 which are an electrode active material, the plurality of primary particles 1 are covered with a carbonaceous coating film 2 and are bonded to each other by the carbonaceous coating film 2, that is, they are bonded by the carbonaceous coating film 2 that is a thin film having a three-dimensional mesh structure to form a secondary particle 3, wherein an overall shape thereof is substantially a ball shape. The carbonaceous coating film 2 contains sulfur. Any part exposed to the outside (outermost surface) of the primary particles 1 constituting the secondary particle 3 is also covered with the carbonaceous coating film 2 that is the thin film. All spaces among the plurality of primary particles included in the secondary particles may be filled with the carbonaceous coating film, or there may be a space or a gap at the spaces.

Examples and preferred examples of carbonaceous materials, electrode active materials, and the others may be the same in the first aspect and the second aspect as long as there is no particular description.

The aforementioned state where the plurality of primary particles 1 are bonded to each other by the carbonaceous coating film 2 that is the thin film having the three-dimensional mesh structure does not means a state where only the same kind of primary particles are merely gathered to form a secondary particle as a just coherer. The state means a state where the primary particles are bonded as strongly as at least a secondary particle can move like one particle when an electrode is formed using the electrode material of the present invention.

It is preferable that the carbonaceous coating film further contains lithium (Li). When the carbonaceous coating film contains sulfur and lithium, conductivity of the electrode material is further improved, which is preferable.

In the first aspect and the second aspect of the electrode material, the electrode active material is not particularly limited, and may be selected as necessary. Preferably, the main component of the electrode active material is one kind selected from the group consisting of lithium cobaltate, lithium nickelate, lithium manganate, lithium titanate, and a compound represented by $Li_xA_yB_zPO_4$ (A is one kind, or two or more kinds selected from the group consisting of Co, Mn, Ni, Fe, Cu, and Cr, and B is one kind, or two or more kinds selected from the group consisting of Mg, Ca, Sr, Ba, Ti, Zn, B, Al, Ga, In, Si, Ge, Sc, Y, and rare-earth elements, where $0 \leq x < 2$, $0 < y < 1.5$, and $0 \leq z < 1.5$).

In the first aspect and the second aspect of the electrode material, the size of the electrode active material is not particularly limited. For example, an average particle size of the primary particles is preferably 0.01 µm or more and 20 µm or less, more preferably 0.01 µm or more and 10 µm or less, and still more preferably 0.02 µm or more and 5 µm or less.

The reason why it is preferable that the average particle size of the primary particles is 0.01 µm or more and 20 µm or less will be described hereinafter. When the average particle size of the primary particles is less than 0.01 µm, it is difficult to sufficiently cover the surfaces of the primary particles with the carbonaceous coating film that is the thin film. As a result, discharge capacity at a high-speed charging and discharging rate is lowered, and it is difficult to realize sufficient charging and discharging rate performance. Meanwhile, when the average particle size of the primary particles is more than 20 µm, internal resistance of the primary particles is increased. Accordingly, discharge capacity at a high-speed charging and discharging rate is insufficient. The size of the primary particles can be measured using a laser diffractive dispersion type particle size distribution measuring apparatus.

In the first aspect and the second aspect of the electrode material, the shape of the electrode active material is not particularly limited, and may be selected as necessary. It is very preferable that the electrode active material has a ball shape, particularly, a spherical shape, since it is easy to generate an electrode material formed of ball-shaped, particularly, spherical secondary particles, using such an electrode active material.

The reason why it is preferable that the electrode material has a ball shape is that the amount of solvent can be reduced at the time of preparing positive electrode producing paste wherein the electrode material, a binder resin (binder), and solvent are mixed, and it is easy to coat a collector with such a positive electrode producing paste.

Furthermore, when the shape of the electrode material is the ball shape, a surface area of the electrode material is minimized. Accordingly, the amount of a binder resin (binder) added to the electrode material mixture can be minimized, and the internal resistance of the obtainable positive electrode can be reduced. Since it is easy to perform closet packing, the packing amount of positive electrode material per unit volume can increase, and therefore, it is possible to increase an electrode density and to provide a high capacity lithium ion battery.

In the first aspect and the second aspect of the electrode material, the thickness of the carbonaceous coating film may be selected as necessary. The thickness thereof is preferably 0.1 nm or more and 20 nm or less, more preferably 0.5 nm or more and 10 nm or less, and still more preferably 1 nm or more and 5 nm or less.

The reason why it is preferable that the thickness of the carbonaceous coating film is 0.1 nm or more and 20 nm or less is as follows. That is, the improvement in conductivity may not be sufficient when the thickness of the carbonaceous coating film is less than 0.1 nm, and on the other hand, the activation of the battery may deteriorate, for example, the battery capacity per unit mass of the electrode material may be decreased, when the thickness of the carbonaceous coating film is more than 20 nm.

In the first aspect and the second aspect of the electrode material, the carbonaceous coating film containing sulfur indicates, for example, that carbon, which is a main component of the carbonaceous coating film, includes some carbon which forms C—S bonding.

The amount of generated C—S bonding is not particularly limited, and may be selected as necessary. Concretely, the amount of generated C—S bonding may be equal to or more than an amount where the generation of the C—S bonding of the electrode material can be recognized by X-ray photoelectron spectroscopy (XPS). For example, the content of sulfur in the carbonaceous coating film is preferably 0.1 mass % or more and 50 mass % or less in terms of sulfur atoms.

When the content of sulfur in the carbonaceous coating film is out of the range of 0.1 mass % or more and 50 mass % or less, the improvement in the conductivity and the application performance of the electrode material may not be sufficiently recognized, and it may be difficult to achieve the advantageous effects of the invention.

In the first aspect and the second aspect of the electrode material, the carbonaceous coating film containing lithium indicates that, for example, the generation of C—Li bonding is recognized in the coating film. Concretely, $LiC_{12}$ that is an interlayer compound of graphite is generated in the coating film.

The amount of generated C—Li bonding is not particularly limited, and may be selected as necessary. Concretely, the amount thereof may be equal to or more than an amount where the generation of the C—Li bonding can be recognized when powder X-ray diffraction method is performed for the electrode material. For example, the content of lithium in the carbonaceous coating film is preferably 0.1 mass % or more and 10 mass % or less in terms of lithium atoms.

When the content of lithium in the carbonaceous coating film is out of this range, more improvement of the electrode material may not be recognized.

It is preferable that the electrode material according to the first aspect and the second aspect of the invention consists of the electrode active material and the carbonaceous coating film which covers the electrode active material and contains sulfur and lithium.

The conductivity of the electrode material according to the first aspect and the second aspect of the invention varies with the kind of the electrode active material, the particle size of the electrode active material, the amount of carbon in the carbonaceous coating film, the content of sulfur, the content of lithium, and the other production conditions, and the conductivity of the electrode material may be selected as necessary in the invention. For example, the conductivity (resistivity) of the electrode material which can be obtained in the invention is preferably 3300 Ωcm or lower, more preferably 3000 Ωcm or lower, and still more preferably 0.01 to 2500 Ωcm.

"Method for Producing Electrode Material"

(1) Method for Producing Electrode Material According to First Embodiment

A method for producing an electrode material according to a first embodiment of the invention will be described hereinafter. That is, in the invention, a method for producing an electrode material including an electrode active material and a carbonaceous coating film covering the electrode active material and containing sulfur is provided, wherein the method includes a first step of preparing slurry including an electrode active material, an organic compound, sulfur or a sulfur compound, and lithium or a lithium compound, which is added as necessary, a second step of spraying and drying the slurry prepared in the first step to generate a granular material, and a third step of performing a heat treatment on the granular material generated in the second step, under a non-oxidizing atmosphere of 500° C. or higher and 1000° C. or lower. The electrode material can be synthesized by such steps.

The electrode active material used in the first step is not particularly limited, and may be selected as necessary. For example, the electrode active material preferably includes, as a main component, one kind thereof selected from the group consisting of lithium cobaltate, lithium nickelate, lithium manganate, lithium titanate, and a compound represented by $Li_xA_yB_zPO_4$ (A is one kind, or two or more kinds selected from the group consisting of Co, Mn, Ni, Fe, Cu, and Cr, and B is one kind, or two or more kinds selected from the group consisting of Mg, Ca, Sr, Ba, Ti, Zn, B, Al, Ga, In, Si, Ge, Sc, Y, and rare-earth elements, where $0 \leq x < 2$, $0 < y < 1.5$, and $0 \leq z < 1.5$).

In the aforementioned formula, it is preferable that A is Mn, Fe, Co, or Ni, and B is Mg, Ca, Sr, Ti, Zn, or Al, from the viewpoint of high discharge potential, abundant resources, safety, and the like.

For example, examples of the rare-earth elements include La, Ce, Pr, Nd, Pm, Sm, Eu, Gd, Tb, Dy, Ho, Er, Tm, Yb, and Lu.

A compound produced by the known method such as a solid phase method, a liquid phase method, and a gas phase method may be used as the aforementioned compound ($Li_xA_yB_zPO_4$ powder) represented by the formula $Li_xA_yB_zPO_4$.

For example, a compound synthesized by the following method can be preferably used as the compound represented by the formula $Li_xA_yB_zPO_4$. A slurry-type mixture obtained by mixing a Li source selected from the group consisting of lithium salts such as lithium acetate ($LiCH_3COO$) and lithium chloride (LiCl) and lithium hydroxide (LiOH), divalent iron salt such as iron chloride (II) ($FeCl_2$) and iron acetate (II) ($Fe(CH_3COO)_2$), a phosphoric acid compound such as phosphoric acid ($H_3PO_4$), ammonium dihydrogen phosphate ($NH_4H_2PO_4$) and diammonium hydrogen phosphate (($NH_4$)$_2$$HPO_4$), and water is put into a pressure resistant airtight container, and hydrothermal synthesis is performed. A precipitate obtained by the synthesis is washed with water, a cake-shaped precursor material is obtained, and the cake-like precursor material is subjected to a heat treatment, thereby producing a desired compound.

The $Li_xA_yB_zPO_4$ powder may be crystalline particles, amorphous particles, or mixed particles wherein crystalline particles and amorphous particles have been mixed. The reason why the powder may be amorphous particles is that amorphous $Li_xA_yB_zPO_4$ powder is crystallized at the time of performing the heat treatment under a non-oxyidizing atmosphere of 500° C. or higher and 1000° C. or lower in the third step.

The size of the $Li_xA_yB_zPO_4$ powder is not particularly limited. For example, the average particle size of the primary particles thereof is preferably 0.01 μm to 20 μm, more preferably 0.01 μm to 10 μm, and still more preferably 0.02 μm to 5 μm.

When the average particle size of the primary particles of the $Li_xA_yB_zPO_4$ powder is less than 0.01 μm, it is difficult to sufficiently cover the surfaces of the primary particles with a thin film of carbon. Accordingly, the discharge capacity at the high-speed charging and discharging rate is decreased, and it may be difficult to realize sufficient charging and discharging rate performance. Meanwhile, when the average particle size of the primary particles exceeds 20 μm, the internal resistance of the primary particles increases. Accordingly, the discharge capacity at the high-speed charging and discharging rate may be insufficient.

The shape of the $Li_xA_yB_zPO_4$ powder is not particularly limited, and may be selected as necessary. Since it is easy to generate an electrode material formed of ball-shaped secondary particles, in particular, formed of spherical secondary particles, it is preferable that the shape of the $Li_xA_yB_zPO_4$ powder also has a ball shape and in particular, a spherical shape.

The organic compound used in the slurry is not particularly limited, and may be selected as necessary. Examples thereof include; polyvinyl alcohol, polyvinyl pyrrolidone, cellulose, starch, gelatin, carboxylmethyl cellulose, methyl cellulose, hydroxy methyl cellulose, hydroxy ethyl cellulose, polyacryl acid, polystyrene sulfonate, polyacryl amide, polyvinyl acetate, glucose, fructose, galactose, manose, maltose, sucrose, lactose, glycogen, pectin, alginic acid, glucomannan, chitin, hyaluronic acid, chondroitin, agarose, and polyether and polyalcohol. Polyether or polyalcohol may be, for example, polyethylene glycol, polypropylene glycol, polyglycerin, glycerin, and the like. One of them may be used singly, and two kinds or more of them may be used in combination. The amount of the organic compound may be selected as necessary. The organic compound can form the main component of the carbonaceous coating film by thermal decomposition.

The sulfur (S) compound is not particularly limited, and may be selected as necessary. As the sulfur compound, for example, sulfuric acid, sulfate, and sulfide may be preferably exemplified.

The combination ratio of the electrode active material and the sulfur or sulfur compound may be equal to or more than an amount where the generation of the C—S bonding in the obtainable electrode material can be recognized by the X-ray photoelectron spectroscopy (XPS). For example, the content of sulfur in the carbonaceous coating film is preferably 0.1 mass % or more and 50 mass % or less in terms of sulfur atoms.

To further improve the conductivity of the electrode material, it is preferable to add lithium (Li) or a lithium (Li) compound into the slurry.

The combination ratio of the electrode active material and the lithium or lithium compound added as necessary may be equal to or more than an amount where the generation of the C—Li bonding in the obtainable electrode material can be recognized by the powder X-ray diffraction method. For example, the content of lithium in the carbonaceous coating film is preferably 0.1 mass % or more and 10 mass % or less in terms of lithium atoms.

The lithium (Li) compound is not particularly limited, and may be selected as necessary. For example, examples thereof include; a lithium inorganic acid salt such as lithium chloride (LiCl), lithium bromate (LiBr), lithium carbonate ($Li_2CO_3$), lithium nitrate ($LiNO_3$), lithium sulfate ($Li_2SO_4$), lithium phosphate ($Li_3PO_4$), and lithium hydroxide (LiOH); a lithium organic acid salt such as lithium acetate ($LiCH_3COO$) and lithium oxalate ($(COOLi)_2$); lithium alkoxide such as lithium ethoxide ($LiC_2H_5O$); and a Li-containing organic such as an organic lithium compound such as ($Li_4(CH_3)_4$). Among them, such a compound containing sulfur and lithium, for example, lithium sulfate ($Li_2SO_4$) is preferable since a sulfur component and a lithium component can be added at once.

When the electrode active material includes lithium as a constituent component, lithium is diffused from the electrode active material to the carbonaceous coating film by the above-described heat treatment, and as the result, the carbonaceous coating film can contain lithium. Accordingly, in such a case, it is not necessary to particularly add lithium or a lithium compound.

A preferable example of the method for producing the electrode material of the invention will be described below. Modification, addition, and omission may be performed as necessary.

An electrode active material, an organic compound, sulfur or a sulfur compound, and lithium or a lithium compound, which is added as necessary are dissolved or dispersed in a solvent, for example, water, thereby preparing a uniform slurry.

A method of dissolving or dispersing the organic compound, the sulfur or sulfur compound, and the lithium or lithium compound added as necessary in a solvent is not particularly limited as long as it is a method in which the electrode active material is dispersed and the organic compound and the sulfur or sulfur compound are dissolved or dispersed. For example, a method of using a medium stirring type dispersion apparatus capable of stirring the medium particles at a high speed such as a planetary ball mill, a vibration ball mill, a bead mill, a paint shaker, or an attritor is preferable.

In this case, it is preferable that the mixture of the electrode active material, the sulfur or sulfur compound, and the lithium or lithium compound added as necessary is first dispersed in a solvent, for example, water, to form primary particles, and then the organic compound is dissolved in the dispersion liquid. Thus, the surfaces of the primary particles of the electrode active material where the sulfur content infiltrates in gaps of the electrode active material are covered with the organic compound, and therefore, the sulfur content infiltrating in the gaps of the electrode active material can efficiently get into the carbonaceous coating film uniformly. As a result, it is possible to obtain the electrode material where the carbonaceous coating film containing sulfur content and deriving from the organic compound exists uniformly between the primary particles of the electrode active material.

Next, the aforementioned slurry is sprayed into a high temperature atmosphere, for example, in the air of normal pressure and 70° C. or higher and 250° C. or less, and the sprayed slurry is dried in the air to generate a granular material. The particle size of liquid droplets at the time of spraying slurry may be selected as necessary, preferably 0.05 to 500 μm, more preferably 0.05 μm to 200 μm, and still more preferably 1 μm to 50 μm. The other spraying conditions may be selected as necessary.

Next, the granular material is subjected to a heat treatment under a non-oxidizing atmosphere of 500° C. or higher and 1000° C. or lower, preferably 600° C. or higher and 900° C. or lower, and still more preferably 600° C. or higher and 750° C. or lower. By this process, the organic compound is thermally decomposed, and the surfaces of the primary particles of the electrode active material are covered with carbon generated by the thermal decomposition. Thus, it is possible to obtain the electrode material according to the first aspect or the electrode material according to the second aspect, or the electrode material that is a mixture of the electrode material according to the first aspect and the electrode material according to the second aspect.

When the heat treatment temperature of the granular material is lower than 500° C., the decomposition and reaction of the organic compound does not sufficiently proceed, the carbonization of the organic compound is insufficient, and a high resistance organic decomposition material is generated. As a result, it may not be possible to obtain sufficient conductivity in the carbonaceous coating film. Meanwhile, when the heat treatment temperature of the granular material is higher than 1000° C., the component constituting the electrode active material is evaporated, for example, lithium (Li) is evaporated, and the composition is varied. In addition to the phenomenon that the composition is varied, that is, the electrode active material with a desired composition cannot obtained, the growth of the particles of the electrode active material is promoted, a fine electrode active material cannot obtained, the discharge capacity at the high-speed charging and discharging rate is decreased, and it is difficult to realize sufficient charging and discharging rate performance.

The non-oxidizing atmosphere at the time of performing the heat treatment on the granular material may be selected as necessary. For example, the non-oxidizing atmosphere is preferably an inert atmosphere such as nitrogen ($N_2$) or argon (Ar). To further suppress the oxidization, the non-oxidizing atmosphere is preferably a reducing atmosphere including a reducing gas such as hydrogen ($H_2$).

The time of the aforementioned heat treatment is not particularly limited as long as the organic compound can be sufficiently carbonated. For example, the process time is generally 0.1 hours to 10 hours, preferably 0.5 hours to 10 hours, and more preferably 0.5 hours to 3 hours.

When the electrode active material includes lithium as the constituent component, lithium is diffused from the electrode active material into the carbonaceous coating film as the heat treatment time extends. As the result, the carbonaceous coating film contains the lithium, and the conductivity of the carbonaceous coating film is further improved. Accordingly, it is preferable that the heat treatment time is long. However, when the heat treatment is excessive, growth of abnormal particles occurs or an electrode active material in which partial lithium defect is caused is generated, and an electrode material causing the deterioration of characteristics of a battery including it is generated, which is not preferable. The compound including sulfur and lithium is preferably used as the sulfur compound. The reason is that, when the compound including sulfur and lithium is used as the sulfur compound, for example, lithium sulfate ($Li_2SO_4$) is used, it is not necessary to use an electrode active material that includes lithium in order to diffuse lithium from the electrode active material into the carbonaceous coating film.

(2) Method for Producing Electrode Material According to Second Embodiment

A method for producing an electrode material according to a second embodiment of the invention is a method for producing an electrode material including an electrode active material and a carbonaceous coating film covering surfaces of the electrode active material and containing sulfur. This method includes a first step of preparing a slurry including a precursor of an electrode active material, an organic compound, sulfur or a sulfur compound, a second step of spraying and drying the slurry prepared in the first step to generate a granular material, and a third step of performing a heat treatment on the granular material generated in the second step, under a non-oxidizing atmosphere of 500° C. or higher and 1000° C. or lower. By such steps, the electrode material is synthesized.

Herein, the precursor of the electrode active material means an intermediate material obtained through a heat treatment of a mixture of each raw material components of the electrode active material, and it means that the material has not become a final electrode active material yet. The example or the preferred example described in the first embodiment can be preferably employed in the same manner in the second embodiment as long as there is no particular description.

The precursor of the electrode active material may be selected as necessary. As the precursor of the electrode active material represented by the formula $Li_xA_yB_zPO_4$ in the electrode active material, for example, an intermediate material obtained by performing a heat treatment on a prepared mixture of a Li source, an A source (A is one kind, or two or more kinds selected from the group consisting of Co, Mn, Ni, Fe, Cu, and Cr), a B source (one kind, or two or more kinds selected from the group of consisting of Mg, Ca, Sr, Ba, Ti, Zn, B, Al, Ga, In, Si, Ge, Sc, Y, and rare-earth elements), a $PO_4$ source, and water may be used as the precursor.

A method for producing the intermediate material may be, for example, a method of putting the aforementioned mixture into a pressure resistant airtight container, performing hydrothermal synthesis, and washing a precipitate obtained by the synthesis with water to obtain a cake-like material as the intermediate material, or a method of spraying and drying the mixture under a high temperature atmosphere to obtain a particle-shaped material as the intermediate material.

A raw material used to generate the precursor of the electrode active material is not particularly limited, and any combination in which a desired material can be obtained by the general hydrothermal synthesis may be used. In consideration of reaction in water, acetate, sulfate, and chloride which are dissoluble in water may be preferably used.

The Li source may be selected as necessary. For example, lithium inorganic acid salt such as lithium chloride (LiCl), lithium bromide (LiBr), lithium carbonate ($Li_2CO_3$), lithium nitrate ($LiNO_3$), lithium sulfate ($Li_2SO_4$), lithium phosphate ($Li_3PO_4$), and lithium hydroxide (LiOH); lithium organic acid salt such as lithium acetate ($LiCH_3COO$) and lithium oxalate (($COOLi)_2$); lithium alkoxide such as lithium ethoxide ($LiC_2H_5O$); and a Li-contained organic metal compound such as an organic lithium compound such as ($Li_4(CH_3)_4$) may be used as the Li source. One of them may be used singly, and two or more kinds may be used in combination.

The A source may be selected as necessary. For example, the A source is preferably a compound including one kind, or two or more kinds selected from the group consisting of Co, Mn, Ni, Fe, Cu, and Cr, as the A source. Particularly, the compound including any one kind of Mn, Fe, Co, and Ni, or two kinds or more of them is preferable from the viewpoint of high discharge potential, abundant resources, safety, and the like. One kind of the compounds may be used singly, or two or more kinds thereof may be used in combination. As such a compound, examples of a Fe component include iron sulfate (II) ($FeSO_4$), iron acetate (II) ($Fe(CH_3COO)_4$), and iron chloride (II) ($FeCl_4$).

The B source may be selected as necessary. The B source is an element different from the elements of the A source, and is preferably a compound including one kind, or two or more kinds of element selected from the group consisting of Mg, Ca, Sr, Ba, Ti, Zn, B, Al, Ga, In, Si, Ge, Sc, Y, and rare-earth elements. Particularly, the compound including any one kind of Mg, Ca, Sr, Ti, Zn and Al, or two or more kinds of them is preferable as the B source from the viewpoint of high discharge potential, abundant resources, safety, and the like. The rare-earth elements which can be included in the B source may be La, Ce, Pr, Nd, Pm, Sm, Eu, Gd, Tb, Dy, Ho, Er, Tm, Yb, Lu, and the like. One kind of the compounds may be used singly, or two kinds or more thereof may be used in combination.

As the compound that is the B source, one kind of metal salts of the aforementioned elements may be preferably used singly, or two or more kinds thereof may be preferably used in combination. For example, a sulfate such as magnesium sulfate ($MgSO_4$) and titanium sulfate ($Ti(SO_4)_4$), an acetate such as magnesium acetate ($Mg(CH_3COO)_2$), and an chloride such as calcium chloride ($CaCl_2$) and titanium tetrachloride ($TiCl_4$) are preferably used.

The $PO_4$ source may be selected as necessary. As the $PO_4$ source, for example, phosphoric acid such as orthophosphoric acid ($H_3PO_4$) and metaphosphoric acid ($HPO_3$); ammonium hydrogen phosphate such as diammonium hydrogen phosphate (($NH_4)_2HPO_4$) and ammonium dihydrogen phosphate ($NH_4H_2PO_4$); and the like may be used as the $PO_4$ source. One kind of them may be used singly, and two or more kinds thereof may be used in combination. Among them, the orthophosphoric acid, the diammonium hydrogen phosphate, and the ammonium dihydrogen phosphate are preferable since they have relatively high purity and it is easy to perform composition control.

In the second embodiment, the electrode material is synthesized in the same manner as the first embodiment, except that the precursor of the electrode active material is used instead of the electrode active material.

"Electrode"

The electrode of the invention is an electrode formed using the electrode material of the invention. The production method is not particularly limited, and may be selected as necessary.

In an example of producing the electrode of the invention, first, the electrode material of the invention is mixed with a binder (binder resin) and a solvent, and a paint or paste for producing a positive electrode is prepared. At this time, a conductive aid such as carbon black may be added as necessary.

Then, the prepared paint or paste for producing the positive electrode is applied onto one face of a metal foil and is dried, thereby obtaining a metal foil where the positive electrode active material is laminated and preserved on one face.

Then, while the positive active material is maintained on one surface of the metal foil in the laminated state, contact bonding is performed by pressing the surface of the laminated positive active material, and drying thereof is performed to produce a collector (positive electrode) having an electrode material layer.

The usable binder resin may be selected as necessary. For example, polytetrafluoroethylene (PTFE) resin, polyvinylidene fluoride (PVdF) resin, fluoro rubber, ethylene-propylene-diene monomer ternary copolymer, and the like are used. One of them may be used singly, and they may be used in combination.

The combination ratio of the electrode material and the binder resin is not particularly limited. For example, as for 100 parts by weight of the electrode material, the binder resin may be about 3 parts by weight to 20 parts by weight, and preferably 5 parts by weight to 15 parts by weight. The amount of the solvent is not particularly limited, and may be appropriately selected. The shape, size, and the like of the electrode may be selected as necessary.

"Battery"

A battery of the invention is a battery provided with the electrode of the invention, as a positive electrode.

In the battery of the invention, a negative electrode, an electrolyte, a separator, a shape of the battery, and the like are not particularly limited, and may be selected as necessary.

The battery of the invention is provided using the positive electrode which is formed using the electrode material of the invention that is the fine spherical powder with the uniform particle size and has high purity. Accordingly, the battery of the invention has large discharge capacity at the high-speed charging and discharging rate, has sufficient charging and discharging rate performance, has stable charging and discharging cycle performance, and achieves high power.

EXAMPLES

Hereinafter, the invention will be described in more detail with reference to examples and comparative examples, but the invention is not limited only to the following examples. Modifications, omissions, and additions may be performed within the scope which does not deviate from the scope of the invention.

Example 1 lithium acetate ($LiCH_3COO$) of 4 mol, iron sulfate (II) ($FeSO_4$) of 2 mol, and phosphate ($H_3PO_4$) of 2 mol were mixed with 2 L (liter) of water for 20 minutes so that the total amount was 4 L (liter), thereby preparing a uniform slurry-like mixture.

Then, the mixture was accommodated in a pressure resistant airtight container with a volume of 8 L (liter) and was subjected to hydrothermal synthesis at 120° C. for 1 hour, and the obtained precipitate was washed with water, thereby obtaining a precursor of a cake-like electrode active material.

Then, about 6.5 g of lithium sulfate ($Li_2SO_4$) as a sulfur compound was added to 150 g (in terms of solid state) of the precursor of the electrode active material, and was kneaded. Then, a material obtained by dissolving 5.5 g of polyethylene glycol as an organic compound in 150 g of water is added to the kneaded material, a 500 g zirconica ball with a diameter of 5 mm was further added as medium particles, it was put into a 2000 mL container and a dispersion process was performed for 12 hours with a ball mill, thereby preparing a uniform slurry.

Then, the slurry was sprayed into the air atmosphere having normal pressure and the temperature of 180° C. and was dried, thereby obtaining a granular material with an average particle size of 6 μm. A spray dryer SD-1 produced by Tokyo Rika Kikai Co., Ltd. was used for spraying and drying (condition: the carrier gas was argon, and the stay time in the furnace was 30 seconds). A laser diffraction diffusion type particle size distribution measuring apparatus SALD2000J produced by Shimadzu Corporation was used for confirmation of the particle size.

The obtained granular material was sintered under a nitrogen atmosphere of 700° C. for 1 hour, thereby obtaining an electrode material (A1).

The obtained electrode material (A1) was observed by a scanning electron microscope (SEM) and a transmission electron microscope (TEM). As a result, it was observed that a plurality of primary particles were collected to be secondary particles, the surfaces of the primary particles are covered with a thin film of carbon, and carbon was interposed between the primary particles. The electrode material (A1) had a ball shape with an average particle size of 5 μm. The average particle size was observed and confirmed by the scanning electron microscope (SEM). (Particle sizes of 50 particles were measured at random, and the average value thereof was calculated)

Example 2

An electrode material (A2) was obtained in the same manner as Example 1, except that about 8.0 g of calcium sulfate ($CaSO_4$) was used as the sulfur compound.

The electrode material (A2) was observed by the scanning electron microscope (SEM) and the transmission electron microscope (TEM). As a result, it was observed that a plurality of primary particles were collected to be secondary particles, the surfaces of the primary particles are covered with a thin film of carbon, and carbon was interposed between the primary particles. The electrode material (A2) had a ball shape with an average particle size of 5 μm.

Example 3

An electrode material (A3) was obtained in the same manner as Example 1, except that sulfuric acid ($H_2SO_4$) of about 5.9 g was used as the sulfur compound.

The electrode material (A3) was observed by the scanning electron microscope (SEM) and the transmission electron microscope (TEM). As a result, it was observed that a plurality of primary particles were collected to be secondary particles, the surfaces of the primary particles are covered with a thin film of carbon, and carbon was interposed between the primary particles. The electrode material (A3) had a ball shape with an average particle size of 5 μm.

Example 4

The precursor of the electrode active material prepared by Example 1 was subjected to a heat treatment under a nitrogen atmosphere of 700° C. for 1 hour, thereby obtaining an electrode active material.

An electrode material (A4) was obtained in the same manner as Example 1, except that the electrode active material of 150 g was used.

The electrode material (A4) was observed by the scanning electron microscope (SEM) and the transmission electron microscope (TEM). As a result, it was observed that a plurality of primary particles were collected to be secondary particles, the surfaces of the primary particles are covered with a thin film of carbon, and carbon was interposed between the primary particles. The electrode material (A4) had a ball shape with an average particle size of 5 μm.

Comparative Example 1

An electrode material (B1) was obtained in the same manner as Example 1, except that the sulfur compound was not added.

The electrode material (B1) was observed by the scanning electron microscope (SEM) and the transmission electron microscope (TEM). As a result, it was observed that a plurality of primary particles were collected to be secondary particles, the surfaces of the primary particles are covered with a thin film of carbon, and carbon was interposed between the primary particles. The electrode material (B1) had a ball shape with an average particle size of 5 μm.

Comparative Example 2

An electrode material (B2) was obtained in the same manner as Example 1, except that the heat treatment temperature was 1050° C.

The electrode material (B2) was observed by the scanning electron microscope (SEM) and the transmission electron microscope (TEM). As a result, it was observed that a plurality of primary particles were collected to be secondary particles, the surfaces of the primary particles are covered with a thin film of carbon, and carbon was interposed between the primary particles. The electrode material (B2) had a ball shape with an average particle size of 5 μm.

(Evaluation of Electrode Materials Powder)

The electrode material powders obtained by Examples 1 to 4 and Comparative Examples 1 and 2 were evaluated with respect to the following evaluations items.

As a referential example, 5.5 g of polyethylene glycol was sintered under a nitrogen atmosphere of 700° C. for 1 hour, thereby obtaining a carbonaceous sintered material. In comparison of the carbonaceous sintered material, identification of the C—S bonding and the C—Li bonding in the carbonaceous coating film were performed.

(1) Identification of C—S Bonding and C—Li Bonding in Carbonaceous Coating Film

Evaluation was performed such that 20 g of the electrode material powder was added to 1 L (liter) of 3N hydrochloric acid, $LiFePO_4$ which corresponds to the electrode material was dissolved therein, and the carbonaceous coating film was obtained by filtrating it and was evaluated by the X-ray diffraction method (XRD). In addition, a chemical bonding state of the carbonaceous film which can be obtained was evaluated by the X-ray photoelectron spectroscopy method (XPS).

(2) Evaluation of Conductivity of Electrode Material

A compact resistivity (conductivity) of the electrode material powder was measured using a low resistivity meter (Loresta-GP, produced by Mitsubishi Chemical Corporation) at 25° C. by a four terminal method. A sample for measuring the compact resistivity was obtained by forming a sample of 3 g at a pressure of 50 MPa.

(3) Application Properties of Electrode Material 2 g of the electrode material powder, 0.2 g of polyvinylidene fluoride (produced by Kureha Chemical Corporation) as binder resin, and 1.5 g of N-methyl-2-pyrrolidone as a solvent were mixed, thereby preparing a paste.

The paste was applied onto an aluminum (Al) foil, using a bar coating method, and the application properties was evaluated.

The evaluation results are shown in Table 1.

TABLE 1

| | Generation of C—S bonding and C—Li bonding | Compact Resistivity (Ωcm) | Application Performance |
|---|---|---|---|
| Example 1 | Recognized | 632 | Excellent |
| Example 2 | Recognized | 855 | Excellent |
| Example 3 | Recognized | 881 | Excellent |
| Example 4 | Recognized | 745 | Excellent |
| Comparative Example 1 | Not Recognized | 3451 | Excellent |
| Comparative Example 2 | Recognized | 15 | Poor |
| Referential Example | Non-crystalline carbon | — | — |

In Table 1, "recognized" means that, in the evaluation of the X-ray diffraction method, a diffraction peak originating from graphite and a diffraction peak originating from $LiC_{12}$, that is an interlayer compound of graphite, are shown, and photoelectron spectrum representing the C—S bonding is shown in the evaluation of the X-ray photoelectron spectroscopy.

In Table 1, "non-crystalline carbon" means that only a broad peak caused by non-crystalline carbon is shown in the X-ray diffraction method and X-ray photoelectron spectroscopy method. In addition, the "non-crystalline carbon" means that it is not a crystalline material.

In Table 1, "excellent" under application properties means a state where a uniform coating film with the same thickness can be formed when the prepared paste is applied onto the aluminum foil, and "poor" means a state where a uniform coating film with the same thickness cannot be formed when the prepared paste is applied onto the aluminum foil. The confirmation of the film thickness was performed by measurement with a micrometer, and the measurement of the uniformity was performed by visual observation.

From the result of Table 1, in the electrode materials (A1 to A4) according to Examples 1 to 4 and the electrode materials (B1 and B2) according to Comparative Examples 1 and 2, the resistivity of the compact was drastically different, and thus it was confirmed that the conductivity of the electrode materials (A1 to A4) according to Examples 1 to 4 was high.

It was also confirmed that the application properties of the electrode materials (A1 to A4) according to Examples 1 to 4 was satisfactory.

The application properties of the electrode material (B1) according to Comparative Example 1 were "poor", and it was additionally confirmed that the specific surface area of the electrode material increases in the electrode material (B1) according to Comparative Example 1.

In the embodiment, a test of producing the electrode and the battery is not described, but the advantageous effects as the electrode and the battery have been confirmed.

INDUSTRIAL APPLICABILITY

The electrode material of the invention is formed of the electrode active material and the carbonaceous coating film covering the electrode active material and containing sulfur, or is an electrode material where a secondary particle includes a plurality of primary particles as the electrode active material and the carbonaceous coating film is interposed between the primary particles. The electrode material of the invention has excellent conductivity and application properties since the carbonaceous coating film contains sulfur. In the battery provided with the positive electrode formed using the electrode material, the charging and discharging capacity (particularly, discharge capacity) are improved, the charging and discharging cycle is stabilized, and high power output is possible. In addition, the battery can be applied to a next generation secondary battery expected to be small and light and to have high capacity. In the case of the next generation secondary battery, the advantageous effects according to the invention are very large.

The method for producing the electrode material of the invention is the method of spraying and drying the slurry including the electrode active material or the precursor of the electrode active material, the organic compound, and the sulfur or sulfur compound to generate the granular material, and performing the heat treatment on the granular material under the non-oxidizing atmosphere of 500° C. or higher and 1000° C. or lower. By this method, the electrode material having characteristics as described above can be efficiently and easily produced without drastic modification of the existing producing apparatus, and the industrial merit is large.

We claim:

1. An electrode material comprising:
    a secondary particle that includes a plurality of primary particles which are an electrode active material, wherein the primary particles are covered with a single layer carbonaceous coating film so that the carbonaceous coating film is interposed between the primary particles, wherein the thickness of the carbonaceous coating film is 0.1 to 20 nm, and wherein a plurality of the primary particles are bonded to each other by the carbonaceous coating film,
    the carbonaceous coating film contains sulfur, and
    the electrode active material includes at least one selected from the group consisting of lithium cobaltate, lithium nickelate, lithium manganate, lithium titanate and a compound represented by $Li_xA_yB_zPO_4$, wherein A is one kind or two or more kinds selected from the group consisting of Co, Mn, Ni, Fe, Cu, and Cr; B is one kind or two or more kinds selected from the group consisting of Mg, Ca, Sr, Ba, Ti, Zn, B, Al, Ga, In, Si, Ge, Sc, Y, and rare-earth elements; $0 \leq x < 2$; $0 < y < 1.5$; and $0 \leq z < 1.5$.

2. The electrode material according to claim 1, wherein the carbonaceous coating film further contains lithium.

3. A method for producing the electrode material of claim 1, comprising:
    spraying and drying slurry including an electrode active material or a precursor of the electrode active material, an organic compound, and sulfur or a sulfur compound to generate a granular material; and
    performing a heat treatment on the granular material under a non-oxidizing atmosphere of 500° C. or higher and 1000° C. or lower to generate the electrode material.

4. The method for producing the electrode material according to claim 3, wherein the slurry further includes at least one of lithium and a lithium compound.

5. An electrode which is formed using an electrode material according to claim 1.

6. A battery having a positive electrode which is the electrode according to claim 5.

7. An electrode which is formed using an electrode material according to claim 2.

8. The electrode material according to claim 1, wherein the electrode active material is the compound represented by $Li_xA_yB_zPO_4$.

9. The electrode material according to claim 1, wherein the carbonaceous coating film that contains sulfur includes carbon that forms C—S bonding.

10. The electrode material according to claim 1, wherein the content of sulfur in the carbonaceous coating film is 0.1 to 50 mass %.

* * * * *